UNITED STATES PATENT OFFICE.

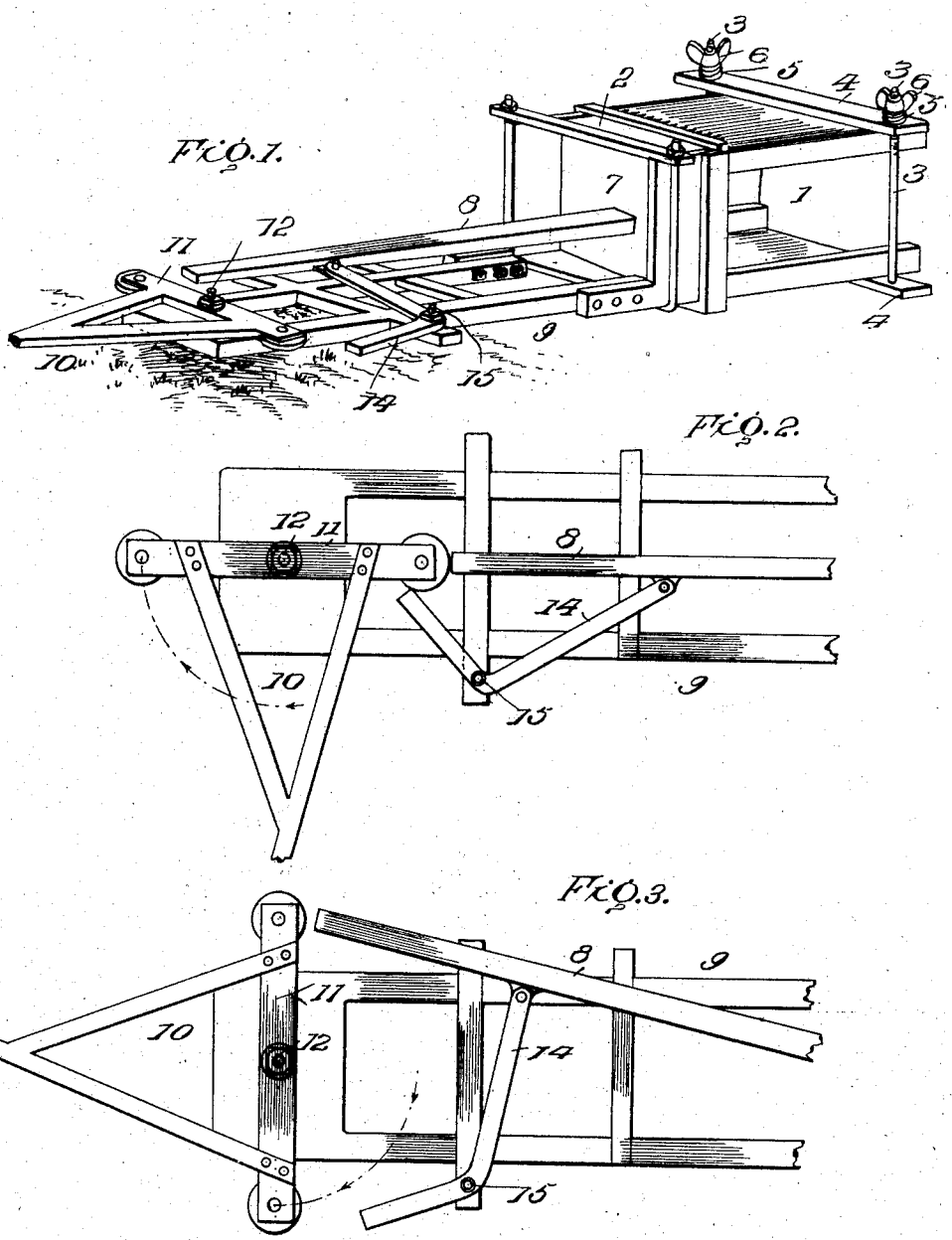

LEONARD B. METCALF, OF SPARTANBURG, SOUTH CAROLINA.

BALING-PRESS.

No. 878,978.  Specification of Letters Patent.  Patented Feb. 11, 1908.

Application filed July 12, 1906. Serial No. 325,953.

*To all whom it may concern:*

Be it known that I, LEONARD B. METCALF, citizen of the United States, residing at Spartanburg, in the county of Spartanburg and State of South Carolina, have invented certain new and useful Improvements in Baling-Presses, of which the following is a specification.

This invention has relation to compressing apparatus of the type specially designed for forming material into bales so as to economize space.

The invention relates more particularly to the type of presses which are intermittently fed, each charge being compressed and the plunger having imparted thereto a reciprocating movement.

The improvement deals chiefly with the actuating mechanism and more particularly with the means whereby the plunger is positively returned to a normal position after each operation, thereby more nearly equalizing the load upon the operating means and obviating the strain and shock incident to a rebound of the plunger or a quick return thereof by means of a resetting spring, and which spring utilizes a certain percentage of the power in the forward movement of the plunger, thereby in the aggregate representing a great amount of force.

For a full description of the invention and the merits thereof and also to acquire a knowledge of the details of construction of the means for effecting the result, reference is to be had to the following description and accompanying drawings:

Figure 1 is a perspective view of a baling press embodying the invention. Fig. 2 is a plan view of the plunger and operating means, showing the position of the parts when the plunger is at the limit of its forward stroke. Fig. 3 is a view of the parts shown in Fig. 2, illustrating their relation when the plunger is at the limit of its outward stroke.

Corresponding and like parts are referred to in the following description and indicated in all the views of the drawings by the same reference characters.

The baling chamber 1 may be of any construction and is provided near one end with a feed opening 2 through which the material is supplied after each operation of the plunger. One side of the chamber is made movable and inclines slightly so as to greatly compress the bale laterally. Rods 3 confine the movable end of the inclined side and pass through openings in end portions of cross bars 4 applied to opposite sides of the baling chamber near the discharge end thereof. Springs 5 are mounted upon end portions of the rods 3 and their effective tension is adapted to be regulated by means of set nuts 6 threaded upon projecting ends of the rods 3. By proper adjustment of the said nuts the outer end of the movable side of the baling chamber may be pressed inward more or less and the tension of the springs 5 so regulated as to offer more or less resistance to the outward movement of said side during the formation of a bale. The plunger 7 is arranged to reciprocate within the baling chamber and is provided with a rod or bar 8 which is adapted to receive the force expended both for advancing and retracting the plunger.

A frame 9 projects from the lower side of the baling chamber and is secured thereto in any manner preferably to admit of its ready detachment when it is required to reduce the press to a compact form for any desired purpose. A sweep is mounted upon the outer end of the frame 9 and comprises a forked lever 10 and cross head 11, the latter being mounted intermediate of its ends, and between the two members of the fork of the lever 10, upon a bolt 12 or like pivot fastening. The extremities of the cross head are arranged so as to alternately engage with the outer end of the rod or bar 8 so as to press the same inward during each half revolution of the sweep. In order that the frictional contact between the cross head and plunger rod may be reduced to the smallest amount possible, rollers are fitted to the extremities of the cross head and are arranged to engage with the outer end of the rod 8. During each complete revolution of the sweep, the plunger is reciprocated twice. The rod or bar 8 receives a combined lateral and longitudinal movement during each in and out stroke of the plunger, and this combined movement imparts a corresponding longitudinal and lateral angular movement to the plunger, whereby the material is compressed both by a rocking and an advance movement of the plunger. The plunger is positively returned to a normal position by means of a resetting lever 14. This lever 14 is of elbow form and has one arm linked or otherwise pivotally connected to the rod 8, and said lever extends laterally and outwardly or away from the plunger 7 and is fulcrumed at its elbow by a pivot fastening 15 secured to the frame 9. The other arm of said elbow lever also extends away from the plunger 7 in a general direction towards the outer end of the rod 8. Hence it is to be particularly noted that when the plunger is pressed forwardly to the limit by the crosshead 11, the free extremity of the elbow lever 24 is in juxtaposition to the outer end of the rod 8 and is in position where it will receive at once at such extremity the pressure of the roller at the end of the sweep. Consequently during the resetting movement or operation, the sweep will act first on the resetting lever at a point farthest away from its fulcrum 15, where the greatest leverage will be obtained.

It will be understood from the foregoing in connection with the accompanying drawings, that there is practically no loss of power in the operation of the press and that the force expended is more nearly equalized since the plunger is both positively advanced and retracted or returned to normal position by the force employed for actuating the working parts. The cross head, when one arm clears the resetting lever, has its opposite end so positioned as to come in contact with the end of the rod or bar 8 so as to advance the plunger in the continued rotation of the sweep. When the plunger is at the limit of its forward stroke, the cross head is in line with the rod or bar 8 and the free end of the resetting lever is adjacent to the end of the cross head in contact with the plunger rod so as to be engaged by said cross head as soon as it leaves the plunger rod. After the inner end of the cross head leaves the plunger rod and comes in contact with the free end of the resetting lever, the latter is turned upon its pivot fastening or support 15 and returns the plunger to normal position, and during the interval between the cross head leaving the resetting lever and again coming in contact with the plunger rod, the press receives a charge through the feed opening 2 in the manner well understood.

Having thus described the invention, what is claimed as new is:

In combination, a baling chamber, a plunger mounted to reciprocate therein, a rod projecting from the plunger and movable therewith in and out of the baling chamber, a cross head mounted to revolve, a support upon which the cross head is mounted, the arms of the cross head being adapted to successively engage the outer end of the plunger rod to press the same inwardly, and an elbow lever fulcrumed at its elbow at a point on the said support one side of the rod, when the latter is in true longitudinal alinement with the baling chamber, one end of said lever being pivotally connected to the plunger rod and extending laterally therefrom, the other arm of said lever extending laterally towards the cross head and terminating with its extremity in the path of movement of the cross head arms, said extremity also terminating flush with the end of one of said cross head arms when the latter stands in contact with the outer end of the plunger rod and is about to leave the latter, the fulcrum of the elbow lever being spaced from the cross head arm a distance fully equal to the length of the last named arm of the elbow lever, whereby the cross head will engage the extremity of said last named arm of the lever as soon as it leaves the outer end of the plunger rod.

In testimony whereof I affix my signature in presence of two witnesses.

LEONARD B. METCALF.

Witnesses:
F. F. FOSTER,
RALPH K. CARSON.